United States Patent Office 3,377,178
Patented Apr. 9, 1968

3,377,178
HIGH ALUMINA BRICK
Eldon D. Miller, Jr., Bridgeville, and Stanley R. Pavlica, Irwin, Pa., assignors to Harbison-Walker Refractories Company, Pittsburgh, Pa.
No Drawing. Filed May 23, 1966, Ser. No. 551,935
7 Claims. (Cl. 106—66)

ABSTRACT OF THE DISCLOSURE

A ceramically bonded brick made from a batch consisting essentially of co-burned $Al_2O_3$-$Cr_2O_3$ grain, finely divided chrome sesquioxide and finely divided high alumina material.

---

This invention relates to high alumina refractories and, more particularly, to improved refractory shapes of chemistry of the type disclosed and claimed in United States Patent No. 3,192,058. Thus, broadly, the invention relates to an $Al_2O_3$:$Cr_2O_3$ refractory system including an effective amount of a particular type of finely divided chromium sesquioxide in the manufacture of shaped ceramically-bonded articles such as brick.

As is well known in the refractories art, there are relatively few inorganic materials which are suitable by reason of high melting point, mineral stability, and various other refractory characteristics to serve as the starting material for the construction of ceramic and refractory articles.

The progress of the refractory and ceramic arts has been paced to large extent by the improvements and changes in the metallurgical industries in which the refractory or ceramic articles have particular utility. As various of the operating parameters of these metallurgical processes of contemporary import have become increasingly severe, greater strength, among other things, has been continually demanded of the refractory products used in such processes. Thus, it is an object of the present invention to provide an $Al_2O_3$:$Cr_2O_3$ type brick of superior strength.

According to one embodiment of this invention, our brick are comprised of about 80%, by weight, of a special nuonfused coburned grain analyzing about 90% $Al_2O_3$ and about 10% $Cr_2O_3$. The remaining 20% of the batch from which the brick are made is 90 parts high-purity alumina of either the tabular or less dense refractory-grade calcined Bayer-process alumina and 10 parts of the finely divided chromium sesquioxide, hereafter defined.

The chromium sesquioxide used as part of the matrix-forming bonding material is a very finely divided powder. The separate and discrete particles of this material average about one micron or less in diameter, and are remarkably uniform in this size range. It crystallizes in the hexagonal system similar to the hematite structure. Physical form is indicated by electron microscope, and crystallinity confirmed by the existence of a definite X-ray diffraction pattern. Such $Cr_2O_3$ material is water insoluble. Accepted specifications for such $Cr_2O_3$ are: purity minimum 97%, water soluble impurities maximum 0.5%, volatile impurities maximum 0.5%. Specific gravity is about 5.1 to 5.2.

According to the preferred embodiment, the overall sizing of the batch used to make the brick is substantially as follows:

20% passes a 4 mesh and rests on a 10 mesh screen;
30% passes a 10 mesh and rests on a 28 mesh screen;
10% passes a 28 mesh and rests on a 65 mesh screen; and the remaining 40% passes the 65 mesh screen.
The coburned grain is preferably most all in the —4 +65 mesh fraction with about 10% (based on total batch weight) being —65 mesh. Of course, there can be some material coarser than 4 and more finer than 65 mesh, as will be understood by those skilled in the art of fabricating refractory brick from refractory-brickmaking size-graded combinations of ingredinets. In any event, we wish at least the major part (over 50%) of the calcined grain to be —4 +65 mesh.

As can be understood from the foregoing, the preferred brick has chemical homogeneity through the aggregate and matrix of a burned brick; that is, the coburned grain is 90% $Al_2O_3$ and 10% $Cr_2O_3$. The —65 mesh portion of the batch used to make the brick is some of the grain and a combination of calcined alumina (or tabular alumina, which is simply a denser and more crystalline form of calcined alumina) and chromium sesquioxide in a 9:1 weight ratio, thus providing the same chemical analyses as in the coarser aggregate which is derived entirely from the coburned grain.

The total $Cr_2O_3$ analysis of the brick can range from 2-30%. It is preferred that there be chemical homogeneity through coarse and fine particles within this range. However, this is not always necessary to obtain satisfactory brick. However, we do wish a combination of $Al_2O_3$ and $Cr_2O_3$ in both the coarse and fine fractions of the batches. Thus, at one end of the range, we can have coburned grain of 99% $Al_2O_3$ and 1% chromic oxide held together by a chemically compatible bonding system of 1 part chromic oxide and 39 parts unfused alumina. We prefer not to have more than 15% $Cr_2O_3$ in either the coarse or fine fraction. Thus, the maximum range of $Cr_2O_3$ for brick according to the invention includes 15% $Cr_2O_3$ contributed by the coburned grain and 15% contributed by the matrix.

In actual comparative testing, brick were made according to Patent No. 3,192,058 and compared with brick according to this invention. Identical manufacturing techniques were used to make the comparative brick. The brick had identical chemical analyses, i.e., on an oxide basis, brick of each type were 90% $Al_2O_3$ and 10% $Cr_2O_3$. For brick of Patent No. 3,192,058, we obtained a modulus of rupture at room temperature of 4860 p.s.i. The comparative brick made according to this invention, having an identical chemical analysis, had a modulus of rupture of 5600 p.s.i. This seemed a rather remarkable increase in modulus of rupture, and we first wondered if the strength increase was solely from the use of coburned grain. To this end, we made a brick of identical chemistry (90% $Al_2O_3$ and 10% $Cr_2O_3$) but entirely of coburned grain. Manufacturing techniques and overall batch size grading was substantially identical to the brick of the comparative testing just reported. The modulus of rupture fell off to 4040 p.s.i., over 800 p.s.i. less than the brick of Patent No. 3,192,058 and 1560 p.s.i. less than the brick only partially made of the coburned grain.

The foregoing testing indicated that the superior strength we desired could only be obtained by a combination of coburned grain and a mixture of non-coburned, matrix forming finely divided $Al_2O_3$ and $Cr_2O_3$.

It is preferred that the alumina material used to make the coburned grain, and also that used to make the matrix-forming material of the brick, be high purity tabular or refractory grade calcined Bayer process alumina. These materials analyze over 99% $Al_2O_3$. However, less pure high alumina materials can be used; for example, calcined South American bauxite. "High alumina materials" has a well understood meaning in the art as, for example, set forth in United States Patent No. 3,067,050. Various high alumina materials, since they are chemically compatible, are frequently blended together to obtain substantially any $Al_2O_3$ content desired. Thus, other high alumina materials can be blended and used to practice our invention. However, we wish at least 80% $Al_2O_3$ in the fired brick, no more than 3% $SiO_2$, and no more than 2% $Fe_2O_3$, for best results.

Our preferred method of making the coburned grain is as follows:

We mix together 90% —325 mesh calcined alumina, of the type sold under the trademark "A–2" alumina, and 10%, by weight, of the finely divided chromic oxide, as above identified. This is tempered with a mixture of about 1% dextrine and 5% water, based on the total batch weight. The mixture is made into dobies. The dobies are burned at 3300° F. for 10 hours. Mineralogically, the resulting product is preponderantly a mixture of two solid-solutions, one of which is alumina in chromic oxide and the other chromic oxide in alumina. There were trace amounts of chromic oxide and about 5% of beta alumina in the grain we made in this manner and used in our test work. If the alumina had been of higher purity—or at least had no soda in it—the beta alumina probably would not have been present, and the trace quantity of chromic oxide would no doubt have been in solid solution. The bulk specific gravity of the coburned grain we used was 3.70.

It should be understood that the coburned grain could be made by extruding a tempered mixture of the type above discussed and then burning the extrusion. It could be briquetted. In other words, almost any forming method which will provide a self-sustaining shape of a finely-divided intimate-admixture of the type above discussed can be used. Also, practically any other type of conventional binding system can be used which does not adversely affect the chemistry of the system on firing; for example, lignin liquor, plain water, carboxymethylcellulose, and so forth.

Using the coburned grain and additional very finely divided alumina and chromic oxide as above discussed provides a brick which is substantially uniform light-rose in color. This color is evident in cut sections as well as over exterior surfaces.

It appears additional solid-solution of the type above discussed is formed through the matrix upon firing of the brick.

Having thus described the invention in detail and with sufficient particularity as to enable those skilled in the art to practice it, what is desired to have protected by Letters Patent is set forth in the following claims.

We claim:

1. A ceramically bonded brick of the $Al_2O_3$ plus $Cr_2O_3$ type and made from a batch consisting essentially of non-fused coburned grain at least the major portion of which is coarsely size graded, and a finely divided non-coburned intimate admixture of finely divided high alumina material and finely divided chromium sesquioxide, said chromium sesquioxide being water-insoluble and comprised of substantially discrete particles all of which are substantially uniform in size and whose diameter averages less than about one micron, there being 1–15% $Cr_2O_3$, on an oxide basis, in the coburned grain and 1–15%, by weight, $Cr_2O_3$, on an oxide basis, in the non-coburned admixture, there being at least about 80% $Al_2O_3$ total in the brick, there being no more than about 3% $SiO_2$ and no more than about 2% $Fe_2O_3$ in the brick.

2. A ceramically bonded brick according to claim 1 in which the chemical analysis thereof is homogeneous throughout said coburned grain and said non-coburned admixture.

3. The ceramically bonded brick according to claim 2 in which the brick total analyzes about 90% $Al_2O_3$ and about 10% $Cr_2O_3$, by weight, on an oxide basis.

4. The ceramically bonded brick according to claim 1 in which the non-fused coburned grain is preponderantly an intimate admixture of two solid solutions consisting of chromic oxide in alumina and alumina in chromic oxide.

5. The ceramically bonded brick according to claim 1 in which the essentially non-fused coburned grain is substantially all —4 +65 mesh but there being up to about 20% of the total batch of —65 mesh coburned grain.

6. The ceramically bonded brick according to claim 1 in which the coburned grain is made from a batch consisting essentially of intimately admixed —325 mesh aluminous material of at least 99% $Al_2O_3$, by weight on an oxide basis, and very finely divided chromium sesquioxide, said chromium sesquioxide being water-insoluble and comprised of substantially discrete particles all of which are substantially uniform in size and whose diameter averages less than about one micron.

7. The ceramically bonded brick according to claim 6 in which the grain analyzes about 90% $Al_2O_3$ and about 10% $Cr_2O_3$, by weight on an oxide basis, and which has a bulk specific gravity on the order of 3.70.

References Cited

UNITED STATES PATENTS 3,192,058   6/1965   Davies et al. _____ 106—65

TOBIAS E. LEVOW, *Primary Examiner.*

JAMES E. POER, *Examiner.*